United States Patent [19]

Kliphuis

[11] 3,998,781

[45] Dec. 21, 1976

[54] POLYOLEFIN COMPOSITION AND METHOD FOR MINIMIZING MIGRATION OF U.V. ABSORBER THEREIN

[75] Inventor: Fritz Lammert Kliphuis, Holland, Mich.

[73] Assignee: Chemetron Corporation, Chicago, Ill.

[22] Filed: Apr. 14, 1975

[21] Appl. No.: 567,825

[52] U.S. Cl. .................. 260/42.45; 260/45.75 N; 260/45.95 N
[51] Int. Cl.² ........................................ C08K 3/36
[58] Field of Search ............... 260/42.45, 45.75 N, 260/45.95 F

[56] References Cited

UNITED STATES PATENTS

| | | | |
|---|---|---|---|
| 3,293,206 | 12/1966 | Horne | 260/42.45 |
| 3,376,251 | 4/1968 | Hennes | 260/42.45 |
| 3,418,270 | 12/1968 | Traub | 260/42.45 |
| 3,553,158 | 1/1971 | Gilfillan | 260/42.45 |

*Primary Examiner*—James H. Derrington
*Attorney, Agent, or Firm*—N. M. Esser

[57] ABSTRACT

The tendencies of ultraviolet light absorbers to exude from polyolefins are minimized by the use of amorphous, micro-sized silica.

10 Claims, No Drawings

3,998,781

POLYOLEFIN COMPOSITION AND METHOD FOR MINIMIZING MIGRATION OF U.V. ABSORBER THEREIN

BACKGROUND OF THE INVENTION

This invention relates to polyolefin compositions containing a high concentration of an ultraviolet light absorber and a method for dispersing and stabilizing said ultraviolet light absorber at said high concentration in polyolefin compositions.

It is often desirable to incorporate an ultraviolet light absorber into a polyolefin composition to increase the stability of the composition in the presence of ultraviolet light. In such an instance the ultraviolet light absorber (U.V. absorber) is usually incorporated into the polyolefin composition at a concentration of from about 0.01 to about 1% by weight. A commonly employed method of incorporating the U.V. absorber into the polyolefin composition comprises mixing a predetermined amount of absorber with a given amount of polyolefin composition to yield a resultant composition having the concentration of U.V. absorber desired for a particular application. The mixing process is time-consuming and requires careful attention to insure that a uniform dispersion of the absorber in the polyolefin is obtained.

Another method of incorporating the U.V. absorber into the polyolefin composition utilizes a two step procedure. In the first step a concentrate is made by dispersing a high concentration of U.V. absorber in a first polyolefin composition. The concentrate is then blended with a second polyolefin composition in an appropriate proportion to achieve the desired concentration of U.V. absorber. This two step method of blending a concentrate with the second polyolefin composition more readily yields a uniform dispersion of absorber in the second polyolefin composition than the single step method of mixing the second polyolefin composition directly with the U.V. absorber.

The concentration of the U.V. absorber in the concentrate is usually from about 10 to about 60% by weight. A problem arises in making such a concentrate with certain desirable ultraviolet light absorbers due to their low viscosity at normal mixing temperatures in the polyolefin composition. The U.V. absorbers that are difficult to incorporate into a concentrate at such high levels are generally those that have a melting point below the temperature at which the absorber and polyolefin are being mixed. Particularly difficult problems arise with absorbers that melt at or below about 100° C. Heretofore, concentrates made with such U.V. absorbers have had a maximum concentration of U.V. absorber of about 5–10% by weight. Prior attempts to produce a concentrate having a concentration of such an absorber above this amount have failed. This was primarily due to the migration of the absorber to the surface of the polyolefin absorber concentrate which thus prevented the production of a stable uniform dispersion of the absorber in the concentrate.

There is, therefore, a need for a polyolefin composition having uniformly dispersed therein from about 10 to about 60%, by weight, of a U.V. absorber having a melting point at or below about 120°–250° C and a method of making the same.

SUMMARY OF THE INVENTION

It is, therefore, a primary object of this invention to overcome the tendency of a certain U.V. absorbers to migrate to the surface of and exude from polyolefins.

It is another object of this invention to provide a stable, uniform dispersion of from about 10 to about 60% by weight of such a U.V. absorber in polyolefin compositions.

An additional object of this invention is to provide a method for dispersing a U.V. absorber having a melting point below about 120°–250° C in a polyolefin composition and minimizing the exudation of said absorber from such composition.

Other objects of this invention will become readily apparent from the following description of the invention.

It has been discovered that amorphous micro-sized silica can be employed in the production of such polyolefin/absorber concentrates having up to about 60% by weight of a U.V. absorber. The silica functions as a processing aid in the formation of a uniform dispersion of the absorber in the polyolefin and also a dispersion stabilizer, reducing the tendency of the absorber to migrate to the surface of an exude from the concentrate.

The objects of this invention are accomplished by a method of making a polyolefin composition having a high concentration of an ultraviolet light absorber dispersed therein which comprises mixing a resinous polyolefin with from about 10% to about 60% by weight of the composition, of an ultraviolet light absorber, and a stabalizing amount of an amorphous, micro-sized silica. The method is particularly advantageous in the dispersion of ultraviolet absorbers which have a tendency to migrate to the surface of and exude from polyolefin compositions.

As used in this application, the term "stabilizing" means causing a uniform dispersion of a U.V. absorber to be substantially permanent.

DESCRIPTION OF THE PREFERRED EMBODIMENTS

The present invention is operable for a wide range of resinous polyolefin compositions which is limited only by practical considerations. Said resinous compositions generally have an average molecular weight within the range of from about 10,000 to about 1,000,000. For example, the plasticity of the composition should be considered since it will affect the ability of the processing equipment to physically mix the polyolefin composition with the ultraviolet absorber. Polyethylene, polypropylene, and polybutene-1 exemplify the polyolefins contemplated in this invention. The concentration of the polyolefin in the concentrate is not critical, but will usually be from about 25% to about 87.5%, by weight.

The ultraviolet light absorbers of particular interest in this invention tend to exude from a polyolefin composition in which they may be dispersed, when present at a concentration above about 10%, by weight. Of specific concern are the ultraviolet light absorbers that melt at or below about 120°–250 ° C., especially those that melt at or below about 100 ° C.

Exemplary of the U.V. absorbers contemplated in this invention are 2-Hydroxy-4-n-octoxybenzophenone (available from American Cyanamide under the trademark Cyasorb-UV-531), Nickel Dibutyl-dithiocarbonate (available from DuPont under the trademark Rylex NBC), and Nickel Bis-Octylphenyl Sulfide (available from Ferro Corporation under the trademark Ferro AM-101), which have melting points of about 49° C, 100° C, and 120° C, respectively.

The amorphous micro-sized silica contemplated by this invention usually has an initial particle size of from about 2 to about 10 microns. It is contemplated that the silica particle size may differ in the final concentrate. The initial specific surface area of the silica is usually from about 200 to about 700 square meters per gram. Exemplary of the silica useful in the present invention is a product sold under the trademark Syloid 244 by Davison Chemical, having an initial particle size of about 3 microns and an initial specific surface area of about 310 square meters per gram.

As stated, the method of this invention comprises mixing a polyolefin composition and a U.V. absorber in the presence of amorphous, micro-sized silica. The resulting concentrate will usually have from about 10% to about 60% by weight U.V. absorber. The problem of uniformly and substantially permanently dispersing a migratory U.V. absorber in polyolefin compositions obviously becomes more difficult as the concentration of the absorber is increased. This invention is, therefore, more advantageous when the concentration of the absorber is from about 20% to about 60% and, in particular, when it is from about 40% to about 60%, by weight. The ratio of absorber to silica will usually range from about 1:2 to about 10:1, but the ratio will be more commonly from about 2:1 to about 4:1. The concentration of silica is primarily dependent upon the concentration of absorber but is generally from about 5% to about 20% by weight. It is desirable to use the largest ratio of absorber to silica that is operable in any given system since this will allow the largest amount of U.V. absorber to be incorporated into a polyolefin with the smallest amount of silica. The actual ratio that is employed in any given system is dependent upon many factors such as the particular polyolefin and U.V. absorber to be used, the mixing temperature, the specific apparatus to be employed to form the concentrate, and the ultimate use of the polyolefin blend to be made from the concentrate.

In one method of forming a concentrate, a master batch is first formed by mixing the polyolefin, ultraviolet light absorber, and silica. This can be done with a double-arm mixer, a two-roll mill, or other suitable mixing apparatus. After the materials are so mixed, the resultant master batch is processed in an extruder. The extruded concentrate may be extruded a second time with an additional "clear" polyolefin composition containing no ultraviolet light absorber. In the latter case an extruded concentrate containing a high concentration of ultraviolet light absorber can be extruded with clear polyolefin composition to yield an extruded concentrate having a lower concentration of absorber than the parent master batch.

In another method the concentrate is made directly in an extruder. In one such method the silica and U.V. absorber are placed in the extruder with a powdered polyolefin such as polypropylene, rather than a pelletized polyolefin, as is usually employed when a master batch is first formed and then processed in an extruder. Irrespective of the method employed, it is usually desirable to use a minor amount of an anti-oxidant such as 4,4'-thiobis-3-methyl-6-tertiarybutylphenol (available from Monsanto Chemical Company under the trademark Santanox-R) when mixing the components.

The following examples are given to further illustrate the present invention. The scope of the invention however, is not restricted to the specific details of the examples.

EXAMPLE 1

On a two-roll mill, 450 grams of polyethylene and 0.6 grams of Santanox-R anti-oxidant are massed and then mixed with 120 grams of Ferro AM-101 U.V. absorber and 30 grams of Syloid 244 silica. The mill is allowed to run for five minutes after the mixture becomes thoroughly wetted. The master batch is removed from the mill, chopped through a ¼ inch screen, and processed through an extruder to yield pellets of the desired concentrate containing 20% ultra-violet light absorber and 5% silica, by weight.

EXAMPLE 2

On a two-roll mill, 150 grams of polyethylene and 0.6 grams of Santanox-R anti-oxidant are massed and then mixed with 360 grams of Rylex NBC U.V. absorber and 90 grams of Syloid 244 silica. The mill is allowed to run for five minutes after the mixture becomes thoroughly wetted. The master batch is removed from the mill, chopped through a ¼ inch screen, and processed through an extruder to yield pellets of the desired concentrate containing 60% of the ultraviolet light absorber, and 15% silica, by weight. A portion of the extruded concentrate is extruded with an equal amount of clear polypropylene to yield a concentrate containing 30% ultraviolet light absorber, 7.5% silica, 12.5% polyethylene, and 50% polypropylene, by weight.

EXAMPLE 3

On a two-roll mill, 300 grams of polyethylene and 0.6 grams of Santanox-R anti-oxidant are massed and then mixed with 240 grams of Rylex NBC U.V. absorber and 60 grams of Syloid 244 silica. The mill is allowed to run for 5 minutes after the mixture becomes thoroughly wetted. The master batch is removed from the mill, chopped through a ¼ inch screen and processed through an extruder to yield pellets of the desired concentrate having a concentration of 10% silica and 40% ultraviolet light absorber, by weight. A portion of the extruded concentrate is processed with an equal amount of clear polypropylene to yield pellets of a concentrate having a concentration of 5% silica, 20% ultraviolet light absorber, 25% polyethylene and 50% polypropylene, by weight.

EXAMPLE 4

Ten parts of Cyasorb U.V.-531 U.V. absorber 2.5 parts of Syloid 244 silica and 87.5 parts of polypropylene powder are processed directly in an extruder. The product is a pelletized concentrate having a concentration of 2.5% silica and 10% ultraviolet light absorber, by weight.

I claim:

1. A method of making a polyolefin composition having a high concentration of an ultraviolet light absorber dispersed therein which comprises mixing a resinous polyolefin, with from about 10% to about 60% by weight of the composition, of an ultraviolet light absorber, which tends to exude from the polyolefin composition and a stabilizing amount of an amorphous, micro-sized silica.

2. The method of claim 1 wherein the ultraviolet light absorber has a melting point at or below about 250° C.

3. The method of claim 1 wherein the ultraviolet light absorber has a melting point at or below about 100° C.

4. The method of claim 1 wherein the ratio of ultraviolet light absorber to amorphous, micro-sized silica is from about 1:2 and about 10:1.

5. The method of claim 1 wherein the ratio of ultraviolet light absorber to amorphous, micro-sized silica is from about 2:1 and about 4:1.

6. The method of claim 5 wherein the ultraviolet light absorber is 2-Hydroxy-4-n-octoxybenzophenone.

7. The method of claim 5 wherein the ultraviolet light absorber is Nickel Dibutyl-dithio carbonate.

8. The method of claim 5 wherein the ultraviolet light absorber is Nickel Bis-Octylphenyl Sulfide.

9. A polyolefin composition having a high concentration of an ultraviolet light absorber dispersed therein which tends to exude from the composition comprising, by weight, from about 25 to about 87.5 percent resinous polyolefin, from about 5 to about 20 percent amorphous, mico-sized silica, and from about 10 to about 60 percent of the ultraviolet light absorber.

10. The compositon of claim 9 wherein the polyolefin has a molecular weight of from about ten thousand to about one million and the silica has an initial specific surface area of from about 200 to about 700 square meters per gram.

* * * * *